(12) United States Patent
Lu

(10) Patent No.: US 9,482,546 B2
(45) Date of Patent: Nov. 1, 2016

(54) METHOD AND SYSTEM FOR PROVIDING ROUTE INFORMATION TO A DESTINATION LOCATION

(71) Applicant: Bravo Ideas Digital Co., Ltd., Tortola (VG)

(72) Inventor: Yi-Chih Lu, Taipei (TW)

(73) Assignee: Bravo Ideas Digital Co., Ltd., Tortola (VG)

( * ) Notice: Subject to any disclaimer, the term of this patent is extended or adjusted under 35 U.S.C. 154(b) by 0 days.

(21) Appl. No.: 14/843,353

(22) Filed: Sep. 2, 2015

(65) Prior Publication Data

US 2016/0223352 A1 Aug. 4, 2016

(30) Foreign Application Priority Data

Jan. 30, 2015 (TW) .............................. 104103258 A

(51) Int. Cl.
*G01C 21/34* (2006.01)
*G01C 21/36* (2006.01)
*H04N 5/445* (2011.01)
*G06F 3/0484* (2013.01)
*G01S 19/42* (2010.01)
*G06F 19/00* (2011.01)

(52) U.S. Cl.
CPC .............. *G01C 21/36* (2013.01); *G01S 19/42* (2013.01); *G06F 3/04842* (2013.01); *H04N 5/44591* (2013.01)

(58) Field of Classification Search
CPC ........ G01C 21/34; G06F 17/00; G06F 19/00
USPC .......................... 701/428, 410, 431; 340/988
See application file for complete search history.

(56) References Cited

U.S. PATENT DOCUMENTS

| 6,374,177 B1 * | 4/2002 | Lee ..................... G01C 21/32 340/988 |
| 6,529,804 B1 * | 3/2003 | Draggon ............ G01C 21/3664 340/425.5 |
| 6,542,812 B1 * | 4/2003 | Obradovich ....... G01C 21/3461 340/990 |

* cited by examiner

*Primary Examiner* — Tan Q Nguyen
(74) *Attorney, Agent, or Firm* — Trop Pruner & Hu, P.C.

(57) ABSTRACT

A method for providing route information is to be implemented by a system coupled to an electronic device. In the method, the system is programmed to: provide an online video-playing interface including a first frame that displays primary video media, and a second frame that displays secondary information media, which is visually recognizable and associated with the primary video media; obtain, upon receipt of a trigger signal associated with selection of the secondary information media, a current location of the electronic device and a destination location associated with the secondary information media; and plan a route from the current location to the destination location, and transmit the route to the electronic device for display.

20 Claims, 7 Drawing Sheets

METHOD AND SYSTEM FOR PROVIDING ROUTE INFORMATION TO A DESTINATION LOCATION

CROSS-REFERENCE TO RELATED APPLICATION

This application claims priority of Taiwanese Application No. 104103258, filed on Jan. 30, 2015.

FIELD

The disclosure relates to a method and a system for providing route information leading to a destination location.

BACKGROUND

Taiwanese Utility Model Patent No. M381867 discloses a leaflet device with guiding function. Referring to FIG. 1, the leaflet device 9 includes a flexible display 91 that is controlled to display an advertisement (e.g., promoting a sale) and to provide navigation information to a location associated with the content of the advertisement (e.g., a store holding the sale). This kind of leaflet devices may be distributed to the public and may guide those intrigued to the location.

However, similar to conventional paper-form leaflets, the above leaflet device contains only pre-stored advertisement provided by a provider of an associated to-be-advertised merchandise. That is, the content of the advertisement may not draw interest from a lot of those to whom the leaflet devices are provided, resulting in ineffective advertising. Furthermore, complex operations in addition to displaying the advertisement, such as planning a route to the location, may adversely affect the performance of the leaflet device.

SUMMARY

Therefore, an object of the disclosure is to provide a method that can alleviate at least one of the drawbacks of the prior arts.

According to the disclosure, the method for providing route information is to be implemented by a system coupled to an electronic device. The method includes the steps of:

a) providing an online video-playing interface on a display screen of the electronic device, the interface including a first frame that displays primary video media, and a second frame that displays secondary information media, the secondary information media being visually recognizable and associated with the primary video media;

b) obtaining, upon receipt of a trigger signal associated with selection of the secondary information media from the electronic device, a current location of the electronic device and a destination location associated with the secondary information media; and c) planning a route from the current location to the destination location, and transmitting the route as the route information to the electronic device for display.

Another object of the disclosure is to provide a system for implementing the method as described above.

According to the disclosure, the system for providing route information is to be coupled to an electronic device, and includes a communication module for communicating with the electronic device, a storage medium, and a processing module.

The storage medium stores primary video media and secondary information media therein. The secondary information media is visually recognizable and is associated with the primary video media.

The processing module is coupled to the communication module and the storage medium, and is programmed to:

provide an online video-playing interface on an display screen of the electronic device, the interface including a first frame that displays the primary video media, and a second frame that displays the secondary information media;

obtain, upon receipt of a trigger signal associated with selection of the secondary information media from the electronic device, a current location of the electronic device and a destination location associated with the secondary information media; and plan a route from the current location to the destination location, and transmit the route as the route information to the electronic device for display.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
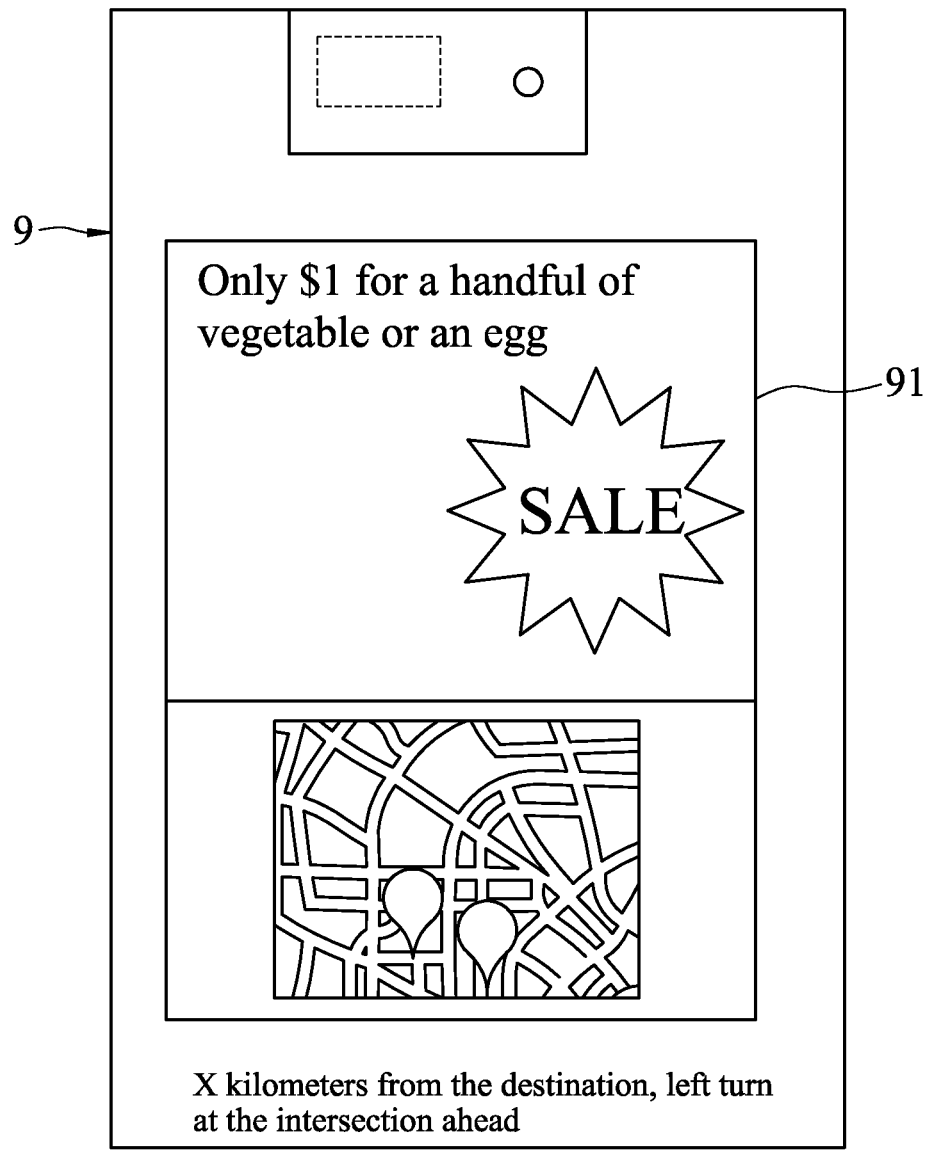
FIG. 1 illustrates a conventional leaflet device that displays an advertisement thereon.
Figure 2:
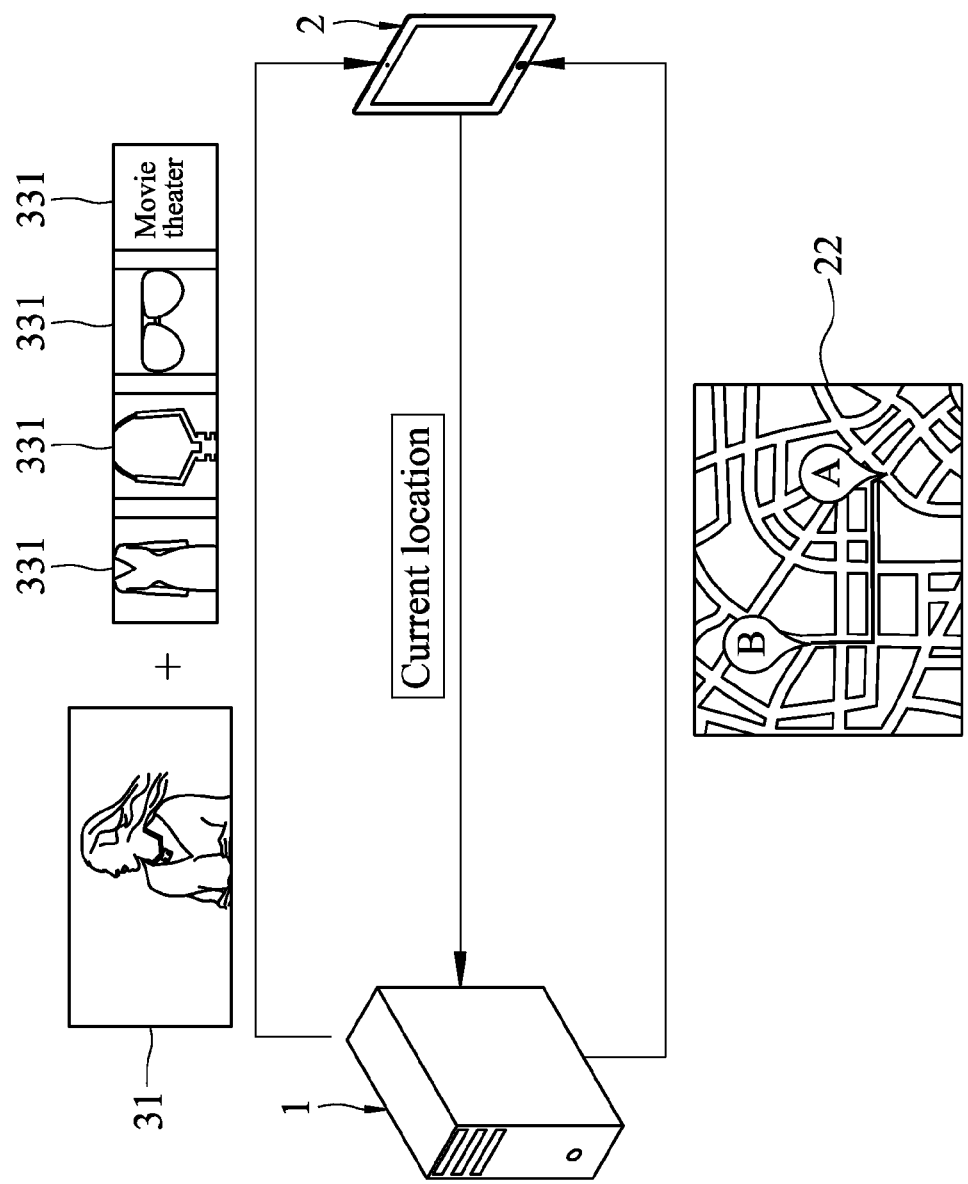
FIG. 2 illustrates a system for providing route information to a destination location, according to an embodiment of the disclosure.
Figure 3:
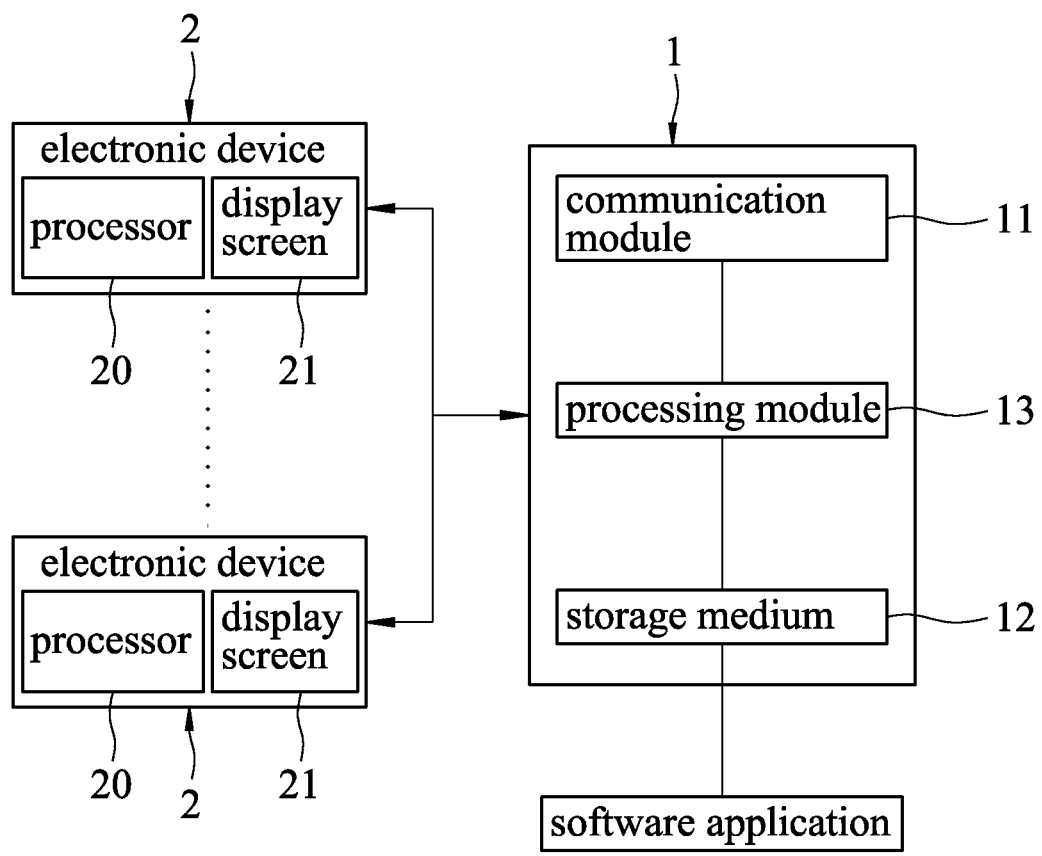
FIG. 3 is a block diagram illustrating components of the system, according to the disclosure.

Referring to FIGS. 2 and 3, a system 1 is for providing route information to a destination location, according to an embodiment of the disclosure. The system 1 is to be coupled to one or more electronic devices 2. The system 1 may be embodied using a host server, and includes a communication module 11, a storage medium 12 and a processing module 13.

In this embodiment, each electronic device 2 may be embodied using a personal computer (PC), a handheld electronic device (e.g., a notebook computer, a tablet computer, etc.), or a portable electronic device (e.g., a smartphone, a personal digital assistant, etc.). Each electronic device 2 includes a processor 20 and a display screen 21.

The communication module 11 is for communicating with the electronic device 2 via a network (e.g., the Internet). The processing module 13 is enabled to allow interaction with the electronic device 2 by providing a webpage with an embedded software application 14. This maybe done using the web socket protocol, and the webpage provided may be created using eXtensible markup language (XML), personal home page (PHP), or active server pages (ASP) .NET framework.

In this embodiment, the embedded software application 14, when executed by the processor 20 of the electronic device 2, is able to provide an online video-playing interface 3 (see FIG. 4), which can be displayed by the display screen 21.

Figure 4:
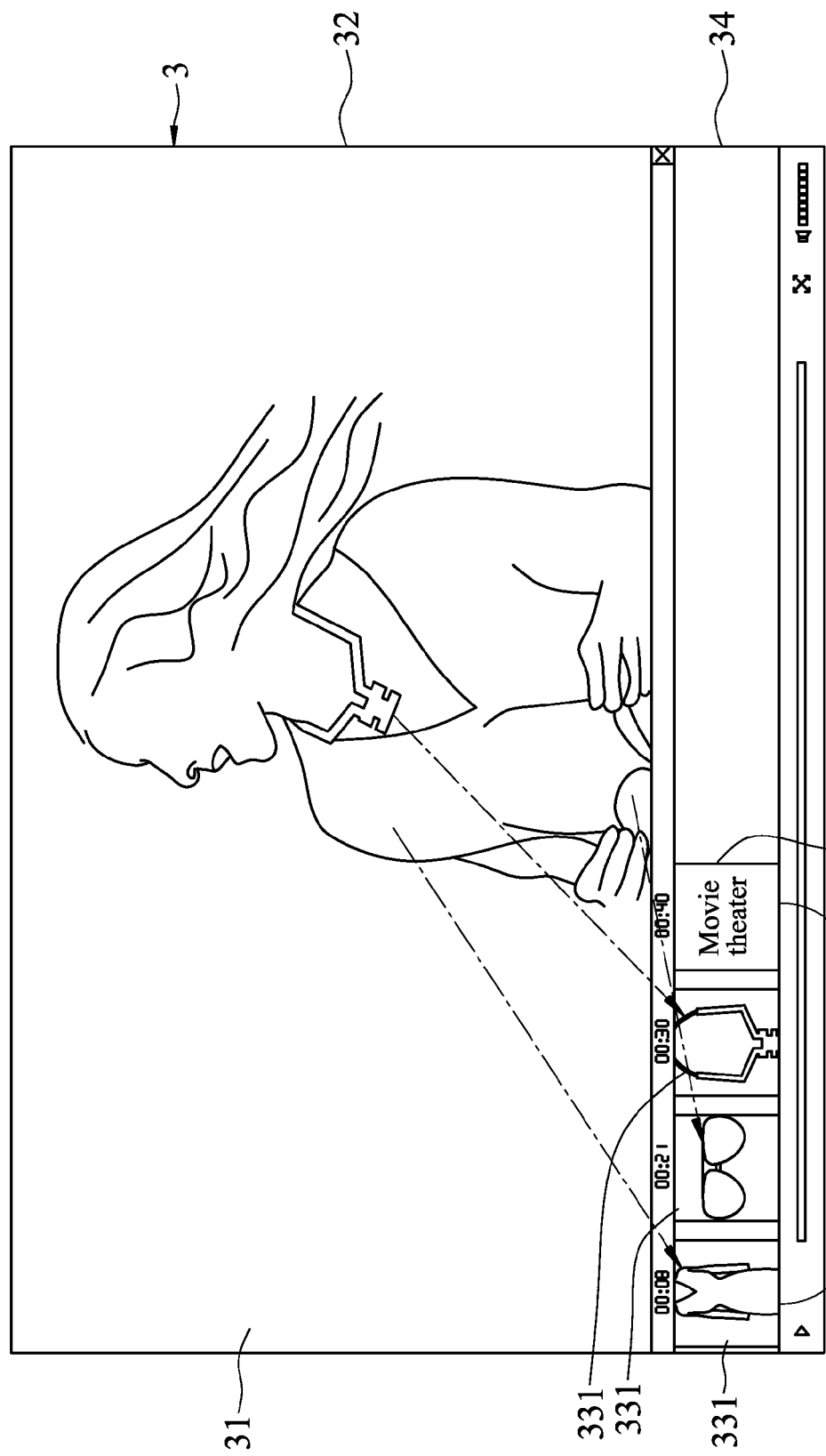
FIG. 4 illustrates an online video-playing interface provided by the system, according to the disclosure.

Referring to FIG. 4, the online video-playing interface 3 includes a first frame 32 and a second frame 34. The first frame 32 and the second frame 34 are displayed on non-overlapping regions of the display screen 21. The first frame 32 displays primary video media 31, and the second frame 34 displays secondary information media 33. In this embodiment, the primary video media 31 and the secondary information media 33 are stored in the storage medium 12. The primary video media 31 includes a video, which may be composed in a network video format such as .flv, H.263, H.264, f4v, rm, wmv, m4v, mov, webm, etc. The secondary information media 33 is visually recognizable and associated with the primary video media 31.

Specifically, the secondary information media 33 includes at least one thumbnail 331 of a product appearing in the primary video media 31. In the example as depicted in FIG. 4, the primary video media 31 may include a movie trailer which features a woman figure. Potential products that appear in the movie trailer (e.g., a dress, a pair of glasses, an neckpiece item) may be chosen and be displayed on the second frame 34 in the form of one or more thumbnails 331. Since the primary video media 31 is a movie trailer, the associated movie may be considered a product as well.

In some embodiments, various non-product objects of interest (e.g., a tourist site, a particular service, etc.) appearing in the primary video media 31 may be singled out for promotion, and one or more relevant, additional thumbnails 331 may appear in the second frame 34.

In some embodiments, the secondary information media 33 may further include other elements such as a video clip, a software program, a text message, etc.

For each product with a thumbnail 331 displayed on the second frame 34, the processing module 13 may provide destination information associated with the product that includes at least one destination location (i.e., at least one location that provides the product, such as a store).

In use, the software application 14 may make the thumbnail 331 a "clickable" object, such that when a user is interested in one of the products, he/she may click or touch the associated thumbnail 331.

When the display screen 21 detects such an action (implying selection of the secondary information media 33), the processor 20 generates a trigger signal and transmits the signal to the system 1.

After receiving the trigger signal, the processing module 13 of the system 1 obtains a current location of the electronic device 2, and said at least one destination location associated with the selected product (represented by the clicked/touched/selected thumbnail 331). In this embodiment, when the electronic device 2 is connected to the Internet, the system 1 obtains the current location of the electronic device 2 by first acquiring, from the electronic device 2, an Internet Protocol (IP) address assigned to the electronic device 2. Using the IP address, the system 1 is able to locate a set of geographical coordinates that is associated with the IP address and that serves as the current location of the electronic device 2.

In other embodiment, when the electronic device 2 is provided with a global positioning system (GPS) component, the system 1 obtains the current location of the electronic device 2 by acquiring GPS information of the electronic device 2.

Figure 5:
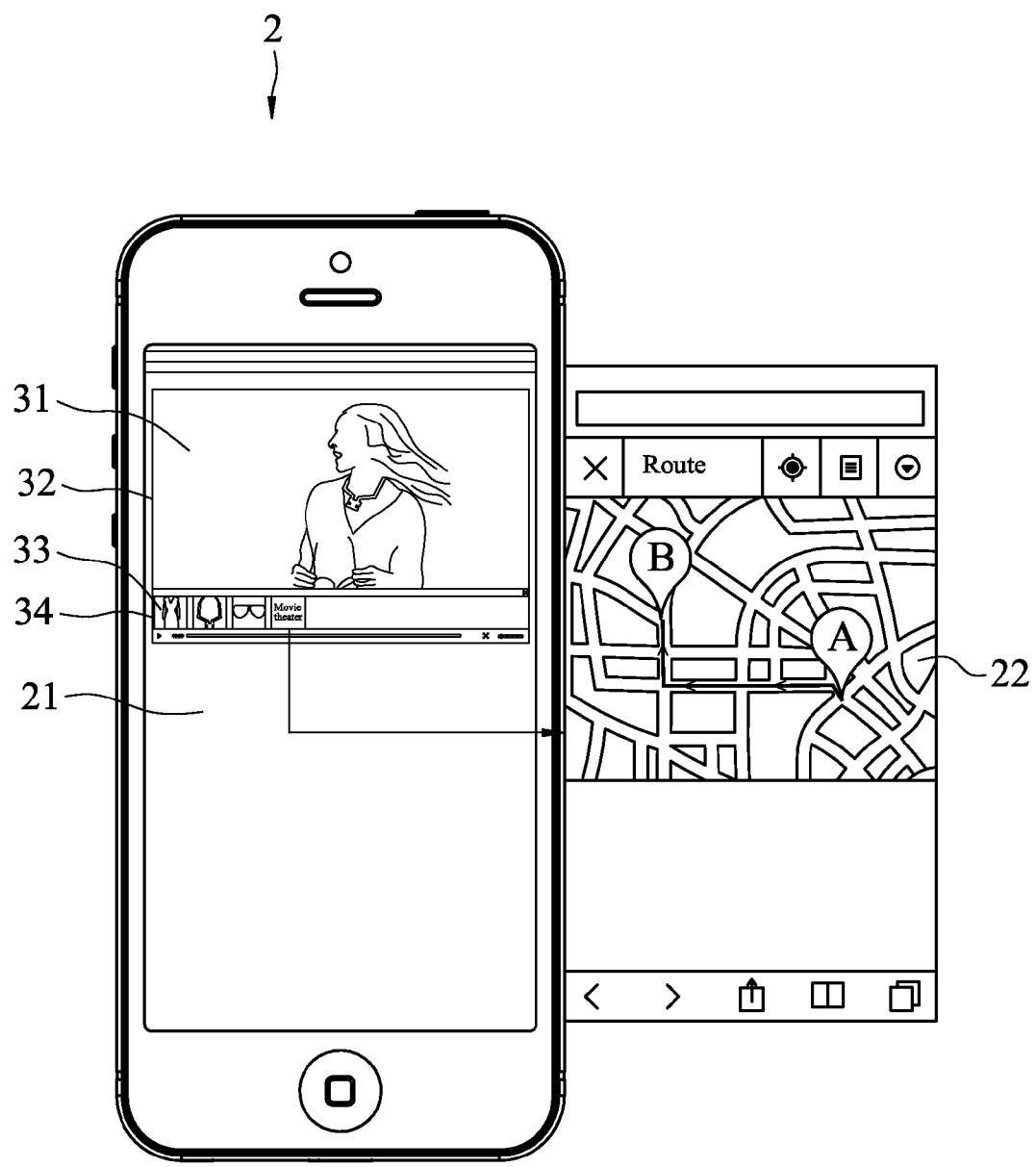
FIG. 5 illustrates a planned route to a destination location displayed on an electronic device.

Afterward, the processing module 13 plans a route from the current location to the destination location, and transmits the route as the route information to the electronic device 2 for display (see FIG. 5).

Figure 6:
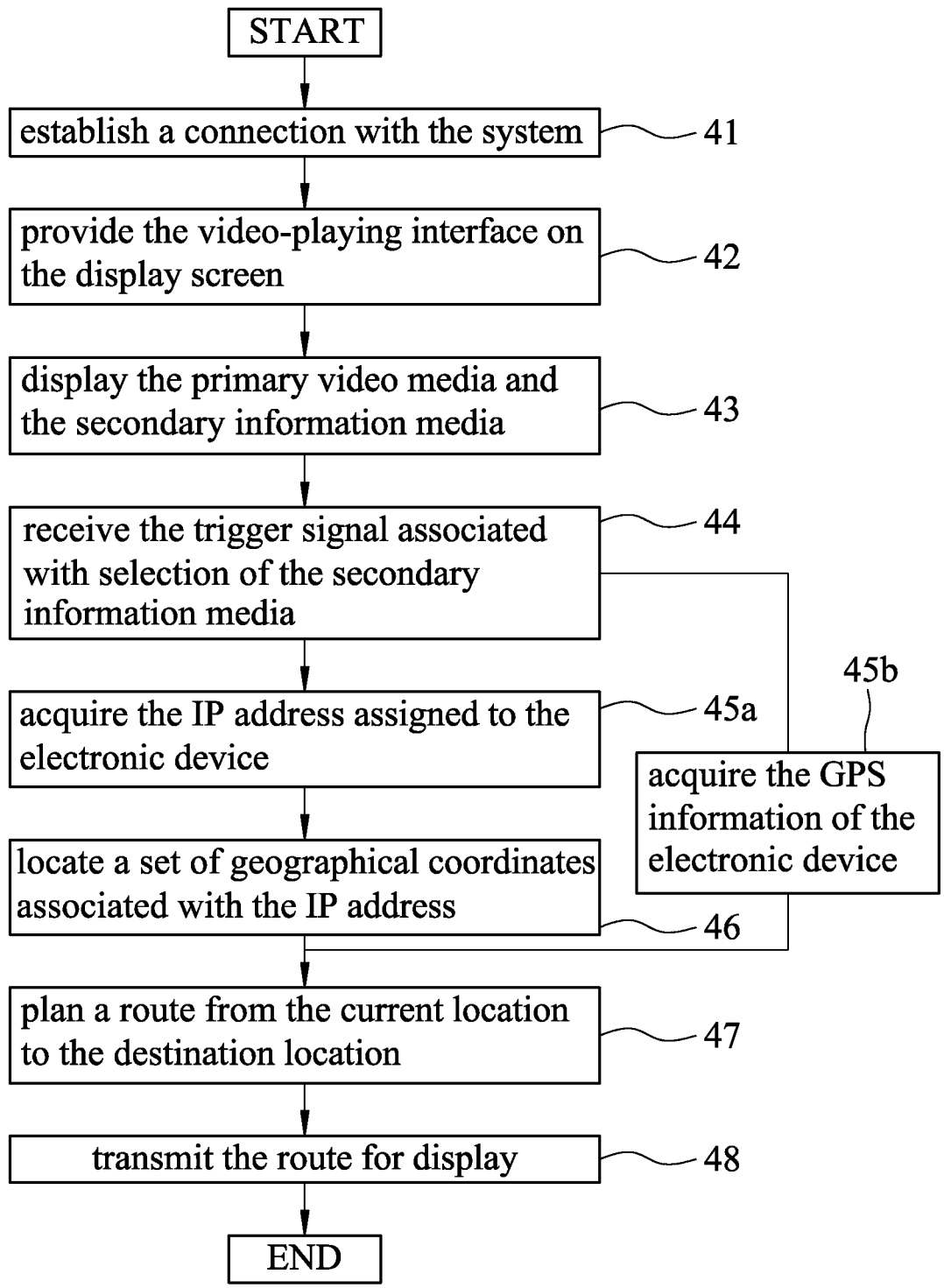
FIG. 6 is a flowchart illustrating steps of a method for providing route information that is implemented by the system.

FIG. 6 illustrates steps of a method for providing route information, which is to be implemented by the system 1 in association with the electronic device 2.

In step 41, the electronic device 2 establishes a connection with the communication module 11 of the system 1. Specifically, a user of the electronic device 2 may access the webpage as seen in FIG. 5.

In step 42, the system 1 provides the video-playing interface 31 on the display screen 21 of the electronic device 2. The user may input an instruction via the webpage in order to start playing the primary video media 31.

In step 43, the system 1 controls the webpage to display on the display screen 21 the primary video media 31 and the secondary information media 33 in the first frame 32 and the second frame 34, respectively. That is to say, the video included in the primary video media 31 starts playing and the corresponding thumbnail(s) 331 is displayed.

It is noted that, in cases where a plurality of thumbnails 331 of respective products appearing in the primary video media 31 are included in the secondary information media 33, the way that the secondary information media 33 is displayed may be different.

In one case, the thumbnails 331 of the secondary information media 33 are displayed in the second frame 34 in accordance with a sequence in which the products appear in the primary video media 31. Taking the movie trailer seen in FIG. 4 as an example, a female character wearing a dress first appears at the instant 00:08 (second), removes her glasses at 00:21, and the camera zooms in at 00:30 on the character's face such that the neckpiece is clearly seen. In practice, as the video is being played, the thumbnails 331 of a dress, a pair of glasses, a neckpiece, and a movie theater will be shown on the display screen 21 at the instants 00:08, 00:21, 00:30 and at the end of the video, respectively.

In another case, the thumbnails 331 of the secondary information media 33 are displayed in the second frame 34 simultaneously at a specific instant.

In step 44, the system 1 receives the trigger signal associated with selection of the secondary information media 33 from the electronic device 2. In one embodiment, the trigger signal may be specifically associated with selection of one of the thumbnails 331.

In step 45a, the system 1 acquires the IP address assigned to the electronic device 2. Accordingly, the system 1 locates a set of geographical coordinates that is associated with the IP address and that serves as the current location of the electronic device 2 in step 46.

Alternatively, in step 45b, the system 1 may acquire the GPS information of the electronic device 2 to serve as the current location of the electronic device 2. Either way, after the current location of the electronic device 2 is obtained, the flow proceeds to step 47.

In step 47, the system 1 plans a route from the current location to the single destination location associated with the secondary information media 33. In particular, the destination location may be specifically associated with the selected one of the thumbnails 331.

Figure 7:
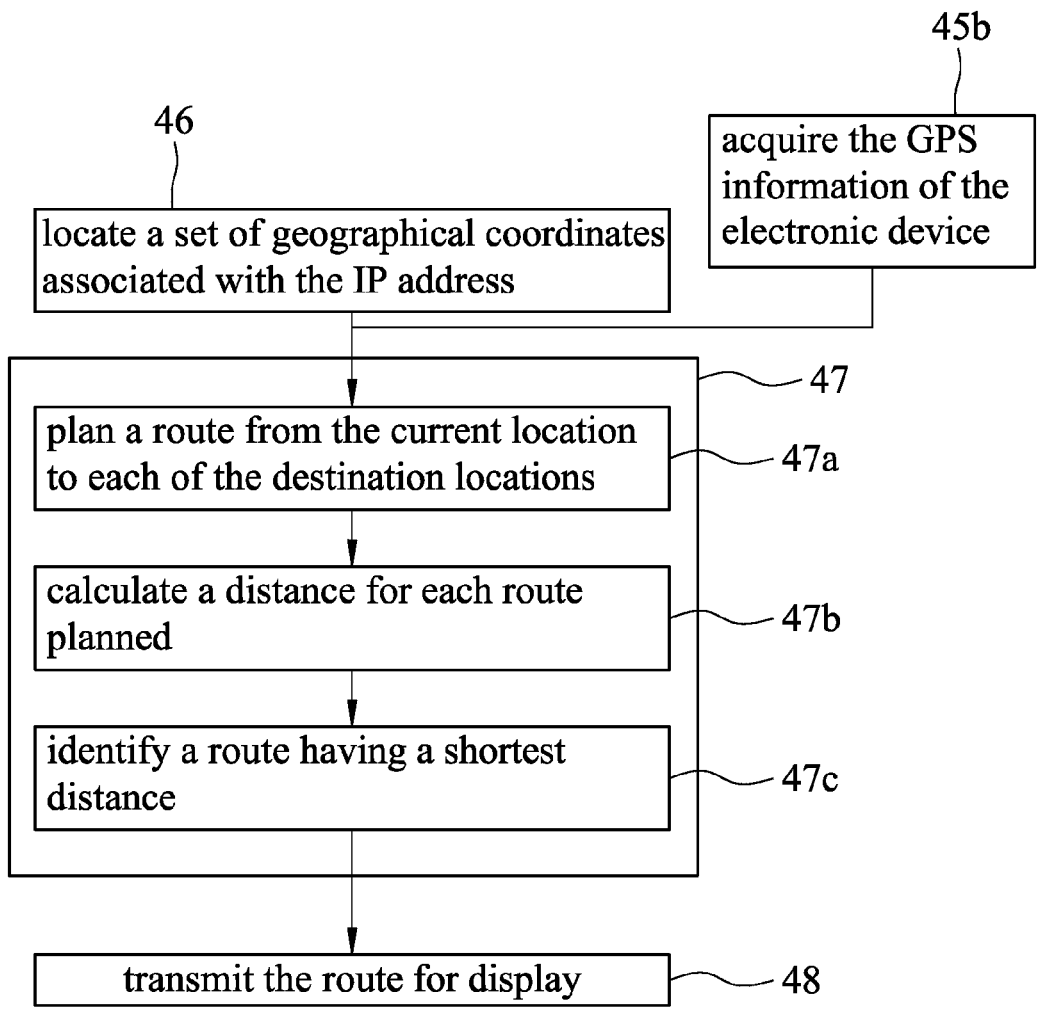
FIG. 7 is a flowchart illustrating sub-steps of operations regarding planning a route.

Further referring to FIG. 7, when the destination information associated with the selected thumbnail 331 includes a plurality of destination locations, the system 1 may plan a route from the current location to each of the destination locations in sub-step 47a, calculate a distance for each route planned in sub-step 47b, and identify a route having a shortest distance in sub-step 47c.

The route planned in step 47 or the route identified in sub-step 47c is then transmitted to the electronic device 2 as the route information for display in step 48. As shown in FIG. 5, after one of the thumbnails 331 is selected, the display screen 21 may display a map 22 with the current location of the electronic device 2 (point A), the destination location (point B), and the planned route (the line between the points A and B) marked on the map 22. For example, the destination information associated with the thumbnail 331 that corresponds to the movie theater includes locations of multiple movie theaters that are showing the movie associated with the movie trailer. In the case where this particular thumbnail 331 is selected by the electronic device 2, the route from the current location of the electronic device 2 to the closest one of the movie theaters will be displayed on the map 22. In the same sense, if the thumbnail 331 corresponding to the glasses is selected, a route to the closest store selling the glasses will be displayed on the map 22.

To sum up, the system 1 and the method according to the disclosure may provide at least the following advantages:

1. The webpage provided by the system 1 is partitioned into the first frame 32 and the second frame 34 to separately display the primary video media 31 (i.e., a video that is requested by the user) and the secondary information media 33 (containing the products that appear in or is associated with the video). As a result, the existence of the second frame 34, which is separately displayed, maybe less distracting for the user. Moreover, the content of the secondary information media 33 is obtained from or directly related to the primary video media 31, in which the user may be more interested.

2. The electronic device 2 in the embodiment is not required to perform operations regarding planning of the route, and is not required to store extra information regarding the pre-determined advertisement in order to display the same to the user. Therefore, the displaying of the route as an advertisement can be done by the electronic device 2 with less resources required at the end of the electronic device 2.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for providing route information to be implemented by a system coupled to an electronic device, said method comprising the steps of:
   a) providing an online video-playing interface on a display screen of the electronic device, the interface including a first frame that displays primary video media, and a second frame that displays secondary information media, the secondary information media being visually recognizable and associated with the primary video media;
   b) obtaining, upon receipt of a trigger signal associated with selection of the secondary information media from the electronic device, a current location of the electronic device and a destination location associated with the secondary information media; and
   c) planning a route from the current location to the destination location, and transmitting the route as the route information to the electronic device for display.

2. The method of claim 1, wherein the secondary information media includes a thumbnail of a product appearing in the primary video media, and the thumbnail is linked to destination information including the destination location.

3. The method of claim 1, wherein the destination information includes at least one location of a provider providing the product to serve as the destination location.

4. The method of claim 2, wherein:
   in step a), the secondary information media includes a plurality of thumbnails of respective products appearing in the primary video media; and
   in step b), the trigger signal is associated with selection of one of the thumbnails.

5. The method of claim 4, wherein in step a), the thumbnails of the secondary information media are displayed in the second frame in accordance with a sequence in which the products appear in the primary video media.

6. The method of claim 4, wherein in step a), the thumbnails of the secondary information media are displayed in the second frame simultaneously.

7. The method of claim 1, wherein in step b), the system is programmed to acquire from the electronic device at least one of global positioning system (GPS) information of the electronic device and an Internet Protocol (IP) address assigned to the electronic device, so as to obtain the current location of the electronic device.

8. The method of claim 7, wherein, in step b), the system is programmed to acquire the IP address assigned to the electronic device, and to locate a set of geographical coordinates that is associated with the IP address and that serves as the current location of the electronic device.

9. The method of claim 1, wherein:
   in step b), the system is programmed to obtain a plurality of destination locations associated with the secondary information media; and
   step c) includes the sub-steps of
      planning a route from the current location to each of the destination locations,
      calculate a distance for each route planned, and
      transmit the route having a shortest distance as the route information to the electronic device.

10. The method of claim 1, wherein in step a), the first frame and the second frame are displayed on non-overlapping regions of the display screen.

11. A system for providing route information to be coupled to an electronic device, comprising:
   a communication module for communicating with the electronic device;
   a storage medium that stores primary video media and secondary information media therein, the secondary information media being visually recognizable and associated with the primary video media; and
   a processing module coupled to said communication module and said storage medium, wherein said processing module is programmed to
      provide an online video-playing interface on an display screen of the electronic device, the interface including a first frame that displays the primary video media, and a second frame that displays the secondary information media,
      obtain, upon receipt of a trigger signal associated with selection of the secondary information media from the electronic device, a current location of the electronic device and a destination location associated with the secondary information media, and plan a route from the current location to the destination location, and transmit the route as the route information to the electronic device for display.

12. The system of claim 11, wherein the secondary information media stored in said storage medium includes a thumbnail of a product appearing in the primary video media, and the thumbnail is linked to destination information including the destination location.

13. The system of claim 11, wherein the destination information stored in said storage medium includes at least one location of a provider providing the product to serve as the destination location.

14. The system of claim 12, wherein the secondary information media stored in said storage medium includes a plurality of thumbnails of respective products appearing in the primary video media, and the trigger signal is associated with selection of one of the thumbnails.

15. The system of claim 14, wherein the online video-playing interface provided by said processing module is controlled to display the thumbnails of the secondary information media in the second frame in accordance with a sequence in which the products appear in the primary video media.

16. The system of claim 14, wherein the online video-playing interface provided by said processing module is controlled to display the thumbnails of the secondary information media in the second frame simultaneously.

17. The system of claim 11, wherein said processing module is further programmed to acquire, from the electronic device, at least one of global positioning system (GPS) information of the electronic device and an Internet Protocol (IP) address assigned to the electronic device, so as to obtain the current location of the electronic device.

18. The system of claim 17, wherein said processing module is further programmed to acquire the IP address assigned to the electronic device, and to locate a set of geographical coordinates that is associated with the IP address and that serves as the current location of the electronic device.

19. The system of claim 11, wherein said processing module is further programmed to:
obtain a plurality of destination locations associated with the secondary information media;
plan a route from the current location to each of the destination locations;
calculate a distance for each route planned; and
transmit the route having a shortest distance as the route information to the electronic device.

20. The system of claim 11, wherein the online video-playing interface provided by said processing module is controlled to display the first frame and the second frame on non-overlapping regions of the display screen.

* * * * *